United States Patent
Rothamel et al.

[11] Patent Number: 5,909,097
[45] Date of Patent: Jun. 1, 1999

[54] METHOD OF STOPPING AN ELECTRIC MOTOR-DRIVEN BALANCING MACHINE MAIN SHAFT

[75] Inventors: Karl Rothamel, Seeheim-Jugenheim; Wolfgang Röwe, Bickenbach, both of Germany

[73] Assignee: Hofmann Werkstatt-Technik GmbH, Pfungstadt, Germany

[21] Appl. No.: 08/923,673

[22] Filed: Sep. 4, 1997

[30] Foreign Application Priority Data

Sep. 6, 1996 [DE] Germany .................. 196 36 267

[51] Int. Cl.[6] .................................................. G05B 13/00
[52] U.S. Cl. .................. 318/561; 318/757; 318/269; 318/369; 73/462
[58] Field of Search ............... 73/462; 318/561, 318/568.22, 268–271, 364, 366, 369, 757

[56] References Cited

U.S. PATENT DOCUMENTS

| | | | |
|---|---|---|---|
| 4,085,619 | 4/1978 | Shapiro et al. | 73/462 |
| 4,458,532 | 7/1984 | Goebel | 73/462 |
| 4,741,210 | 5/1988 | Maus | 73/462 |
| 4,868,762 | 9/1989 | Grim et al. | 364/508 |
| 5,001,408 | 3/1991 | Kyogoku et al. | 318/364 |
| 5,255,563 | 10/1993 | Schmidt | 73/462 |
| 5,495,158 | 2/1996 | Schmidt et al. | 318/561 |

*Primary Examiner*—Brian Sircus
*Attorney, Agent, or Firm*—Pillsbury Madison & Sutro LLP

[57] ABSTRACT

A method of stopping an electric motor-driven balancing machine main shaft after an unbalance measuring run in a specific rotary angle stoppage position corresponding to a desired balancing rotary angle position provides that in the course of retardation of the main shaft, a timer is switched on at a short angular spacing of for example 3° before the main shaft reaches the desired rotary angle stoppage position. The timer predetermines a time interval which is determined from the rotary speed and the rotary angle position of the main shaft at the time of the timer being switched on, with the retardation operation being stopped at the end of that time interval, with the main shaft stationary. The retardation operation can be effected by torque reversal of the motor.

21 Claims, 3 Drawing Sheets

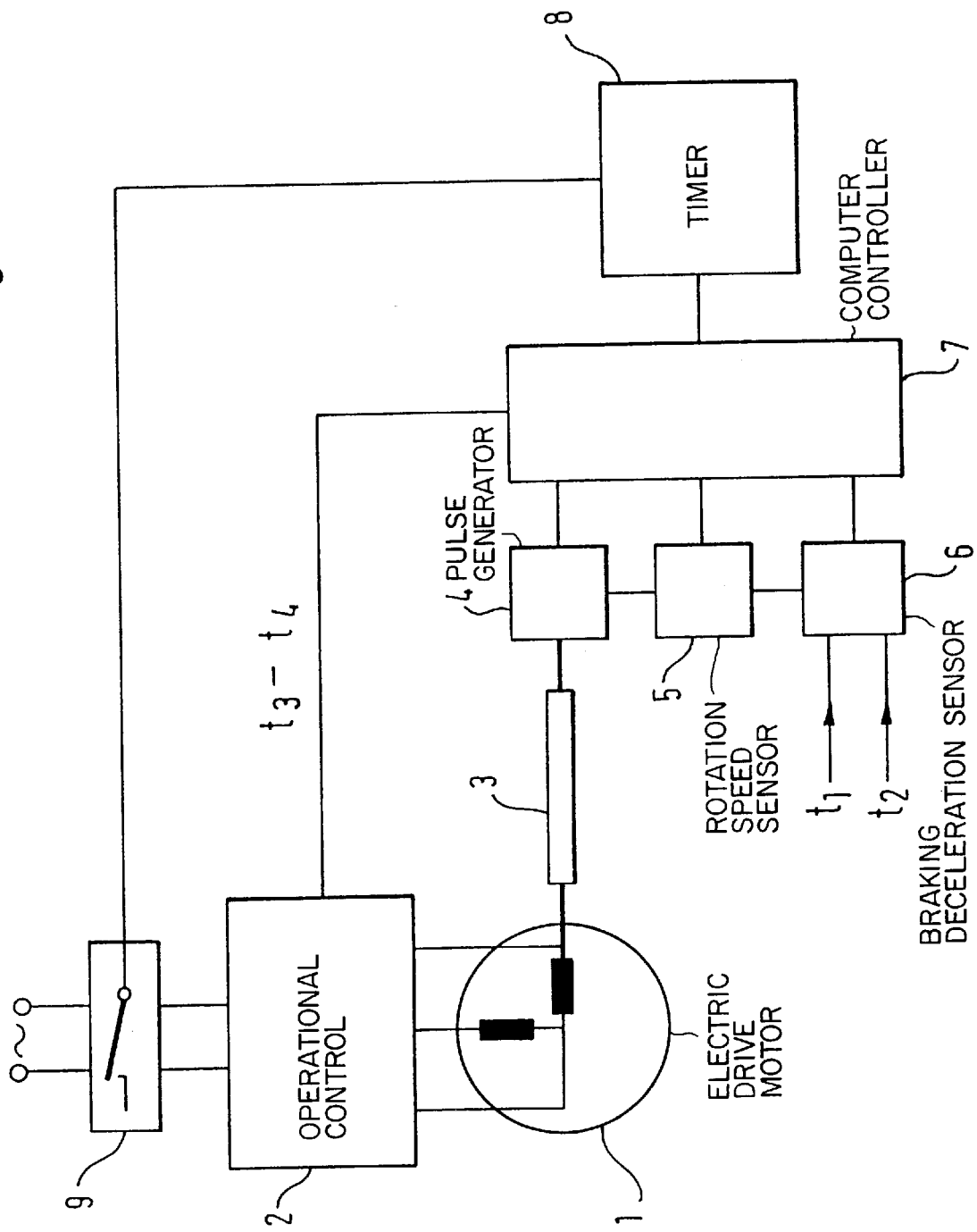

METHOD OF STOPPING AN ELECTRIC MOTOR-DRIVEN BALANCING MACHINE MAIN SHAFT

FIELD OF THE INVENTION

The invention concerns a method of stopping a balancing machine main shaft in a given rotary angle stoppage position after an imbalance measuring run.

BACKGROUND OF THE INVENTION

In a typical balancing machine for balancing a rotary member such as a motor vehicle wheel, the rotary member or wheel is mounted on a balancing machine main shaft, which is rotated by an electric motor. Any imbalance in the rotary member is ascertained by an imbalance measuring run during which the main shaft with the rotary member is rotated by the electric motor.

When the main shaft is stopped, the main shaft or the rotary member generally is not disposed in the appropriate position whereby compensation of the imbalance of the rotary member can be achieved. Correcting the imbalance is typically accomplished by fitting a balancing weight to the rotary member. When balancing a wheel it is desirable that the wheel clamped to the main shaft be moved into a specific position, referred to as the balancing angular position, such that the position on the motor vehicle wheel to which a suitable balancing weight is to be fitted is disposed perpendicularly above the main shaft, that is to say in the 12 o'clock position. This position is called the easy balancing position because the balancing operator has ready access to the point on the vehicle wheel to which the balancing weight is to be fitted. In a typical balancing machine, when balancing the rotary member, it is necessary to rotate by hand the rotary member from the position where it stopped after the imbalance measuring run to the desired rotary angular position for the balancing operation which corresponds to the easy balancing position.

SUMMARY OF THE INVENTION

An object of the present invention is to provide a method of stopping a main shaft of a balancing machine at a given rotary angle position, such that after an imbalance measuring run the main shaft and a rotary member carried thereon are stopped at a position corresponding to the balancing position, without involving additional rotary movement of the main shaft.

Another object of the present invention is to provide an automated procedure for stopping a balancing machine main shaft directly in a suitable position for balancing the rotary member.

Still another object of the present invention is to provide a method of stopping a balancing machine main shaft at a given angular position using simple structural configurations which are readily provided in the balancing machine.

In accordance with the principles of the present invention, the foregoing and other objects are attained by a method which involves reducing the rotation of the main shaft and bringing it to a halt. The deceleration of the main shaft in the braking procedure is measured and used to ascertain a braking distance corresponding to a given rotary angle. The braking procedure coordinates the end of the ascertained braking distance with the desired rotary angle stopping position of the main shaft.

The main shaft rotation speed varies. The braking process can be interrupted in order to adapt the braking distance ascertained from the deceleration of the main shaft to the target braking distance required for attaining the desired rotary angle stoppage position of the main shaft. Interrupting the braking operation preferably occurs after measuring the braking deceleration and such measurement can be effected by determining the speeds of rotation during at least two measurement times during deceleration after the imbalance measurement procedure. To do that, it is also possible, at predetermined rotary speeds, to ascertain the resulting moments in time involved in that respect. To attain the desired rotary angle stoppage position, the braking operation can be resumed with the measured level of deceleration at a given angle, preferably 30°, before the main shaft reaches the stoppage position.

According to a preferred method of the invention, when braking, a timer switches on at a small angular distance before the main shaft reaches the desired rotary angle stoppage position. The timer utilizes a calculated period of time, which is determined partly from the rotary angular position and the rotary speed of the main shaft when the timer switches on and which ends when the main shaft is in the rotary angle stoppage position corresponding to the required balancing position. The timer then stops the main shaft at a time independent of any further main shaft rotary movement. The timer can be loaded with the time from the rotary speed of the main shaft when the timer switches on, and the previously ascertained deceleration.

EP 0 074 416 B1 provides for coupling a pulse generator to a rotary member to be balanced, whose pulses are then counted. The counting procedures are re-started for rotary movement by a reference marking on the rotary member. The counting procedure is used for ascertaining the angular position of the rotary member as it is turned to the required balancing position. The pulse generator which provides for the counting procedure is coupled to the rotary member to be balanced.

In contrast thereto, the present invention uses a time basis independent of the rotary member for controlling stoppage of the main shaft of the balancing machine in the appropriate position, more especially in the region in which the main shaft and the rotary member clamped thereon are just before the appropriate rotary angle position for the balancing procedure, for example 3° before that position. When the main shaft has a low rotation speed just before reaching the balancing position, the periods of time between the increments produced by the incremental generator coupled to the main shaft are so great that the instantaneous rotary speed can only be ascertained with a significant time delay. The arrangement of EP 0 074 416 B1 therefore does not permit the main shaft to be brought to a stop precisely at the desired balancing position under accurate control with respect to its rotary speed.

The present invention provides for stopping the main shaft of the balancing machine in the desired or target balancing position, after the imbalance measuring run. In that respect the rotary member or wheel is stopped at the easy balancing position, perpendicularly above the main shaft, at which a balancing weight is to be fitted to the wheel in a comfortable and convenient manner.

The braking operation can be implemented in a conventional manner, for example by means of an electromagnetic brake unit as is also shown in EP 0 550 816 A2. In this respect, during the braking operation, at a given time or at a given angle before the main shaft reaches the balancing position, for example about 3° to 15° before that position, the difference is ascertained between the actual rotary speed and a reference or target rotary speed calculated on the basis of the measured braking deceleration at that time. The braking moment of the electromagnetic brake unit is set in dependence on the ascertained difference in order to adapt the remaining braking travel to the residual rotary angle as far as the balancing position of the main shaft. Preferably the braking operation is effected without an additional brake unit by means of the electric motor which furnishes the drive for the main shaft in the imbalance measuring procedure. The motor used is preferably a single-phase ac motor as is to be found for example in EP 0 524 465 B1, or a three-phase motor. In that situation the braking action is produced solely by the torque in the drive motor, sometimes referred to as counter-current braking. As soon as the main shaft and a rotary member such as a vehicle wheel have reached the desired balancing position, the switched-on timer control operating on a time basis independent of the rotation of the rotary member, causes the motor current to be switched off precisely at the balancing position, that is to say when the main shaft is stopped (when the speed of rotation is zero), and thus prevents a reversal in the direction of rotation of the main shaft. The main shaft accordingly remains at that desired angular position. When measuring the period of time which is loaded into the timer, due consideration is given to the rotary angle position that the main shaft adopts shortly before reaching the required balancing position, for example the rotary angle difference of 3° as referred to above, and also the rotary speed at which the main shaft and the rotary member mounted thereon are rotating in the above-mentioned rotary angle position which is just before the balancing position. That period of time can therefore be used as a control parameter for precisely switching off the motor current upon stoppage of the main shaft in the balancing position (when the speed of rotation of the main shaft is zero).

Further objects, features and advantages of the invention will be apparent from the following description of a preferred embodiment of the method of the invention.

BRIEF DESCRIPTION OF THE DRAWING

FIG. 3 shows a block circuit diagram containing the essential functional groups for carrying the method according to the invention into effect.

DESCRIPTION OF THE PREFERRED EMBODIMENT

Looking first at FIG. 3, this figure illustrates an electric drive motor 1 such as a single-phase ac motor or a three-phase motor, an operational control arrangement 2 and a main shaft of a balancing machine 3 on which a rotary member such as a motor vehicle wheel can be mounted for balancing thereof.

Figure 1:
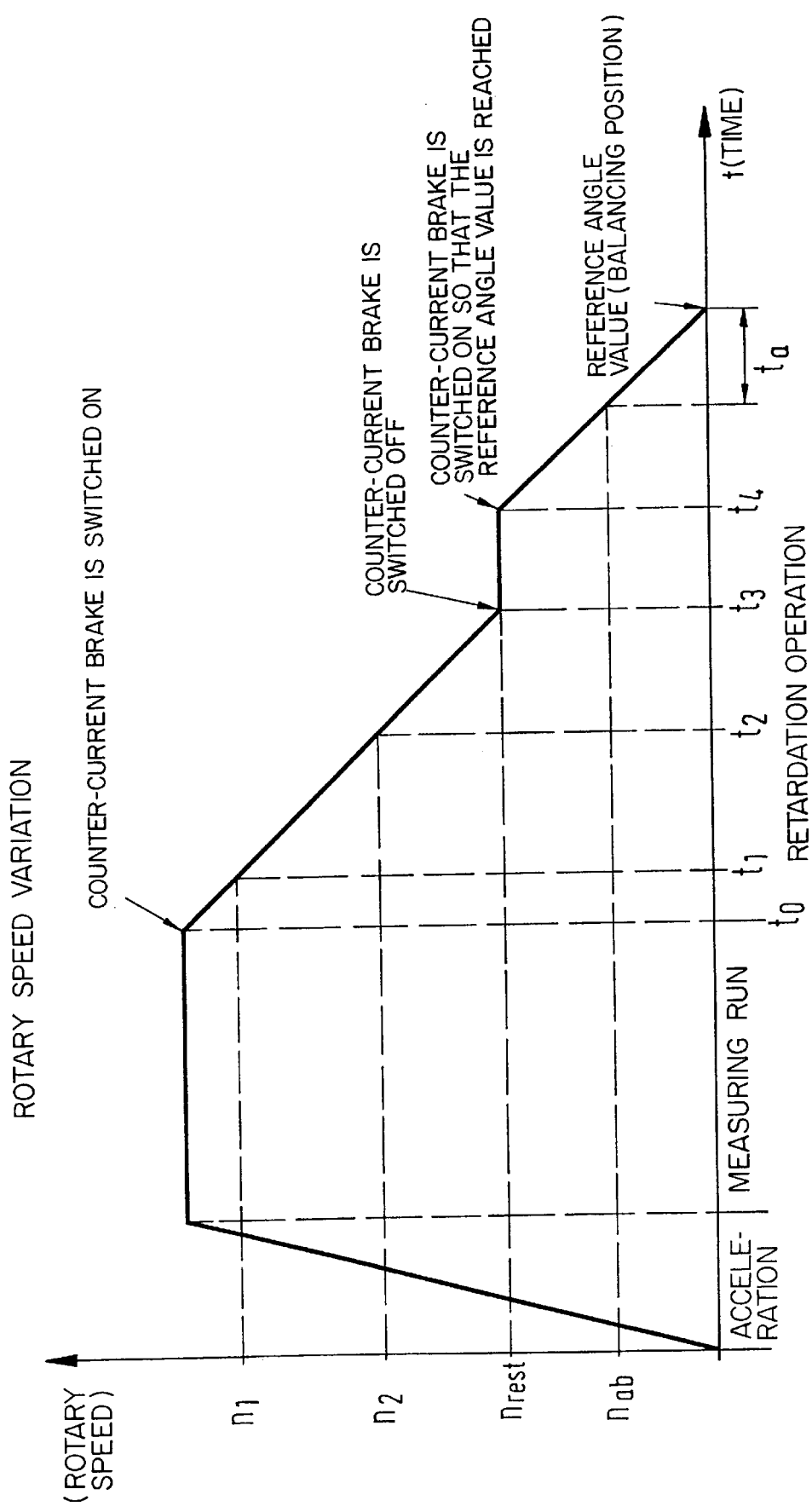
FIG. 1 is a graph showing the variation with respect to time of the main shaft rotary speed in the acceleration phase in the measuring run and in the retardation phase until the main shaft stops, the stopped condition being produced by implementing an embodiment of the method of the invention.
Figure 2:
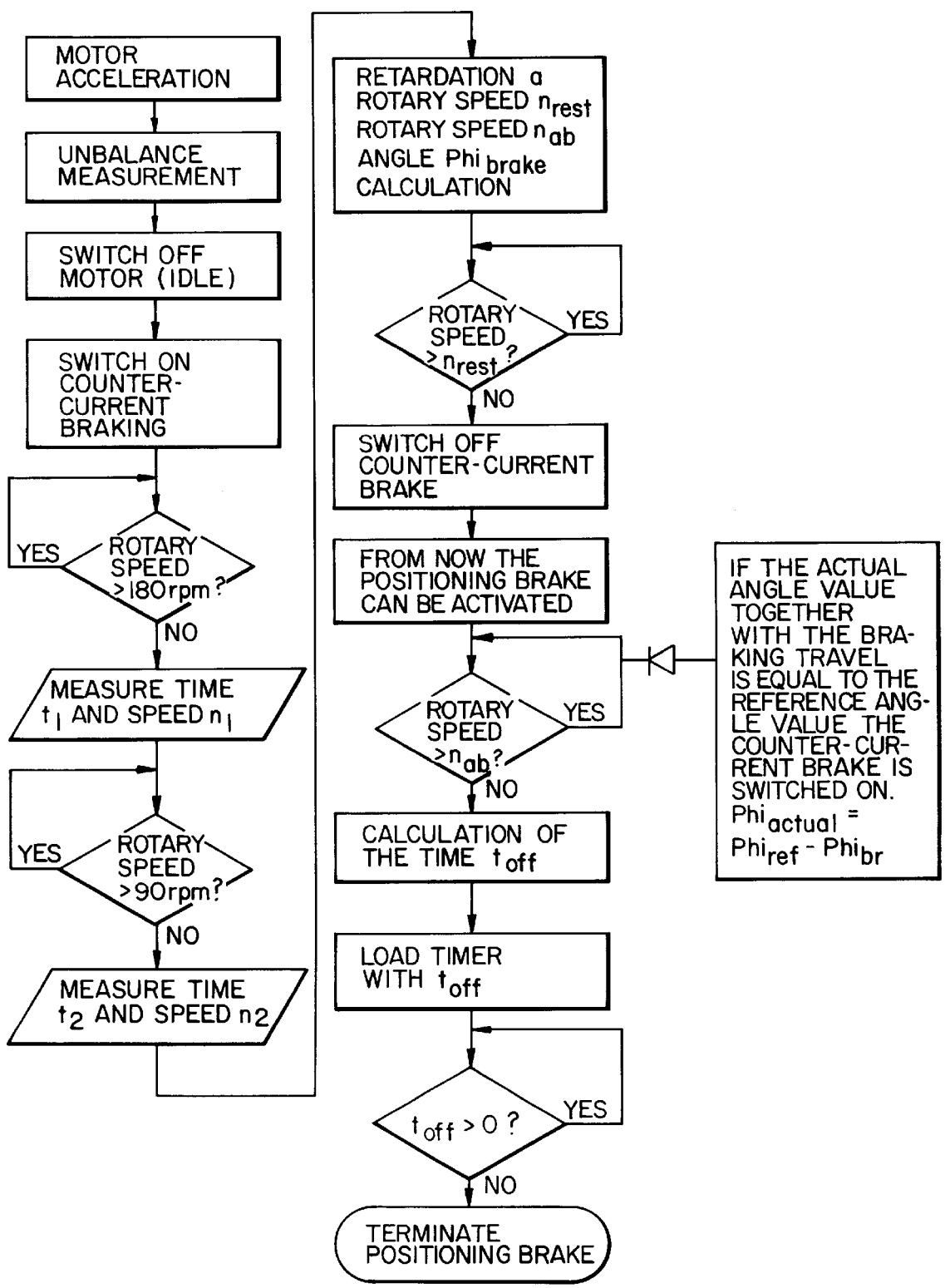
FIG. 2 shows a flow chart to achieve the performance configuration shown in FIG. 1.

Referring now to FIGS. 1 and 2, in relation to the rotary member such as the motor vehicle wheel which is clamped on the main shaft 3 of the balancing machine, the main shaft 3 is brought up to the measuring rotary speed in an acceleration phase by means of the motor 1. At the measuring rotary speed the imbalance measurement procedure can then be performed. The motor is then briefly switched over to idle for a short period of time (for example 40 m/sec) and the counter-current braking effect is switched on at time to in FIG. 1 so that retardation of the main shaft 3 rotation speed then begins. The counter-current braking effect, produced by a reversal of electric motor torque, is effected by the phase sequence of the ac voltage applied to the motor being changed over. In the case of the single-phase ac motor, the braking effect corresponds to a phase displacement of 90° while in the case of a three-phase motor it corresponds to a phase displacement of 120°. During the braking operation, the respective rotary speed indicated at $n_1$ and $n_2$ of the main shaft 3 is measured at two measurement points indicated at times $t_1$ and $t_2$ in FIG. 1. That can be effected by means of a pulse generator or incremental generator as indicated at 4 in FIG. 3, which is coupled directly or indirectly to the main shaft 3. The braking deceleration "a" is calculated therefrom in accordance with the following equation:

$$a = \frac{2\pi}{60} \cdot \frac{n_2 - n_1}{t_2 - t_1}$$

In the course of the braking procedure, the method involves selecting a residual rotary speed $n_r$ at which the main shaft with the rotary member or wheel clamped thereon can be brought to a stop, with the ascertained deceleration "a" within a given angular difference φr which is preferably 30°. Preferably, the braking operation afforded by the torque reversal effect is terminated in order to obtain the rotary angle difference (residual rotary angle $\phi_r=30°$), so that the deceleration "a", the residual rotary angle $\phi_r$ and the residual rotary speed $n_r$ occur in precisely mutually matching relationship. The residual rotary speed $n_r$ ensues in accordance with the following formula:

$$n_r = \frac{60}{2\pi}\sqrt{-2\varphi_r}$$

During the renewed braking operation, with the counter-current braking effect due to the torque reversal being brought into operation again, the rotary speed of the main shaft drops to the value indicated at $n_{ab}$ in FIG. 1. That rotary speed is reached shortly before the reference or target rotary angle which corresponds to the balancing rotary angle position. The corresponding rotary angle position $\phi_{ab}$ can be for example 3° before the reference or target rotary angle constituting the balancing position ($\phi_{ab}=3°$). When that rotary speed is reached a timer is loaded with a time indicated by the period of time interval $t_a$ in FIG. 1. The timer predetermines the time interval $t_a$, at the end of which the main shaft and the rotary member or wheel clamped thereon come to a stop. The timer is indicated by reference numeral 8 in FIG. 3.

The timer 8 provides that, at that time, the counter-current braking action produced by the electrical drive motor in its reversed-torque mode is switched off. The time interval $t_a$ which corresponds at the rotary speed $n_{ab}$ to the residual angle $\phi_{ab}$ which is for example 3°, ensues in accordance with the following formula:

$$t_a = \frac{2\pi}{60} \frac{n_{ab}}{a}$$

The rotary speed $n_{ab}$ contained in that formula (for example $\phi_{ab}=3°$) before the reference angular position value is reached is given by the following formula:

$$n_{ab} = \frac{60}{2\pi} \sqrt{-2\varphi_{ab}}$$

It is necessary for attainment of the reference or target angular position (being the required balancing position) of the main shaft and the rotary member or wheel clamped thereon to be detected immediately upon stoppage of the main shaft, that is to say with the rotary speed then being zero. In order to prevent a reversal in the direction of rotation thereof, at that time the supply of current to the electric motor which provides for the counter-current braking effect must be switched off. Therefore, as already indicated above, that switching-off operation is effected below a given speed threshold which is for example 3° prior to the stoppage condition, not dependent on the speed of rotation but dependent on time. An incremental generator which is coupled to the rotary movement of the main shaft or rotary member in the above-discussed manner, for example as in DE 31 24 248 A1 or EP 0 074 416 A1 cannot enable the motor to be switched off, thereby to terminate the counter-current braking action precisely when the main shaft and the rotary member have reached the reference or target angular position which constitutes the required balancing position. That is because the rotary speed can only be calculated from the time between the relevant increments and those periods of time between increments progressively increasing with a falling rotary speed until finally at a rotary speed of zero there is no longer any change in signal or increment. The rotary speed ascertained in that way is always an average value from the last time interval and is necessarily already obsolete when it is obtained. If relays are used for switching the braking operation, more particularly for switching the electric motor on and off, then the switching delay $t_{RV}$ of the relay or relays can also be taken into consideration, in respect of the time with which the timer is loaded. In that case the time $t_a$ to be put into the timer is as follows:

$$t_a = \frac{2\pi}{60} \cdot \frac{n_{ab}}{a} - t_{RV}$$

Reference will now be made to FIG. 3 showing a block circuit diagram of an embodiment of an arrangement with which the above-described method of the invention can be carried into effect.

As already indicated above, reference numeral I denotes an electric drive motor which is shown in the form of a single-phase ac motor for driving a main shaft 3, illustrated diagrammatically, of a balancing machine, on which a rotary member such as more particularly a motor vehicle wheel to be balanced is mounted. Connected to the main shaft 3 is a pulse generator or incremental generator 4 which supplies angle increments. The generator 4 may be for example of any suitable configuration, for example of the configuration shown in DE 31 24 248 A1.

With reference to DE 31 24 248 A1, a rotary speed sensor 5 is connected to the generator 4 which forms a rotary speed-proportional signal from the sequence with respect to the time of the angle increments supplied by the generator 4. Connected to the rotary speed sensor 5 is a braking deceleration sensor 6 which, after implementation of an imbalance measuring run, at different times $t_1$ and $t_2$ (FIG. 1), ascertains the rotary speed-proportional signals supplied by the rotary speed sensor 5 and, with respect to the time difference $t_2-t_1$, forms a braking deceleration signal that is proportional during the braking procedure.

Control of the various operating conditions of the electric motor 1 is effected by means of an operational control arrangement 2 which has various relays for the forward and reverse running of the motor and for switching a torque capacitor. The operational control arrangement 2 can be of any suitable configuration, as is known from EP 0 524 465 A1, for a single-phase ac motor. The arrangement may include a device for minimizing switching sparking or arcing at the motor relays. For that purpose, the assembly may include an amplifier circuit for detecting the relay switching times by program-controlled evaluation of the current configuration in the relay coils upon switching-on and switching-off, an amplifier circuit for converting the main voltage into a main-frequency rectangular signal for program-controlled main-synchronous switching of the relays and a resistor for discharging the torque capacitor for the single-phase ac motor by way of the rest contact of the relay serving for switching of the capacitor so that its charge condition upon switching-on is known. No switching sparks or arcing is caused by opening the relay contacts shortly before the zero-passage of the main voltage.

The signals formed by the generator 4, the rotary speed sensor 5 and the deceleration sensor 6 are evaluated and analyzed in a computer 7 which can be in the form of a microcontroller. From the braking deceleration which is supplied by the deceleration sensor 6, the computer 7 determines the resulting braking travel which the main shaft 3 and the rotary member clamped thereon cover in the braking operation. The braking travel or distance corresponds to a given rotary angle. As the respective rotary angle of the main shaft 3 is ascertained by the generator 4, the computer 7 performs a control action, more especially by suitably altering the rotary speed of the main shaft, such that the end of the ascertained braking travel coincides with the desired stoppage rotary angle position which corresponds therefore to the balancing position. In the illustrated embodiment that is achieved by the braking operation being interrupted during a period between the times indicated at $t_3$ and $t_4$ in FIG. 1.

During the phase involving retardation of the main shaft 3 speed and the rotary member carried thereon, after the imbalance measuring run, the operational control arrangement 2 is actuated by the computer 7 or other central computing unit (not shown) in such a way that the relays and capacitors are in the switching state shown in FIG. 4 of EP 0 524 465 B1 to which reference is accordingly directed for incorporation of that disclosure herein. That operating state which represents a first braking phase occurs during a period of time which extends in FIG. 1 from the switch-on time to of the braking operation (counter-current braking effect is switched on) to the time $t_3$ (counter-current braking effect is switched off). When the counter-current braking effect is switched off, during a time from $t_3$ to $t_4$, the operating state shown in FIG. 3 of EP 0 524 465 B1 may be set for example in the operational control arrangement 2. During that time, the main shaft 3 continues to rotate at an almost constant rotary speed $n_r$ for a short period from time $t_3$ to time $t_4$. That interruption in the braking operation provides that the actual braking travel is adjusted such that when the braking procedure is switched on again at the time indicated at $t_4$ in FIG. 1, at the end of the subsequent second braking phase, the main shaft 3 and the rotary member carried thereon have reached the reference or target rotary angle position which thus corresponds to the required balancing position.

When carrying out the braking operation by means of the electric motor 1 which is also used to drive the main shaft 3, it is necessary for the motor to be switched off when the end of the braking operation is attained, that is to say when the main shaft 3 is stopped, with a rotary speed of zero, in order to prevent the motor and the main shaft from rotating in the opposite direction. However, the motor cannot be switched off with the required degree of accuracy if it is only the angular information afforded by the generator 4 that is evaluated at a low speed of rotary movement in the proximity of the stoppage condition. More specifically, at low rotary speeds, the periods of time between the individual pulses outputted by the generator 4 are so great that the instantaneous rotary speed can only be ascertained with a time delay, so that the motor 1 cannot be switched off to prevent further rotary movement thereof in the reverse direction after reaching the stoppage condition, solely on the basis of the information from the incremental generator 4. To overcome that difficulty, the above-mentioned timer 8 which is loaded with a time (the above-defined time interval $t_a$) is connected to the computer 7 when a given rotary speed threshold is reached. That rotary speed threshold occurs at the above-defined rotary speed $n_{ab}$ and can occur when there is still a residual angle $\phi_{ab}$ of about 3°, before the appropriate balancing position is reached. As indicated above, the time interval $t_a$ is determined from the a rotary speed $n_{ab}$ obtained when the timer 8 is switched on, the residual angle $\phi_{ab}$, the braking deceleration a and, a switching delay $t_{RV}$ for the relay or relays to be switched in the operational control arrangement 2, if $t_{RV}$ is taken into account. After expiration of the time interval $t_a$, the timer 8 opens the switch indicated at 9 in FIG. 3 so that the supply of current to the motor 1 is interrupted. This may be for example a main switch with which the drive motor can be appropriately connected to the supply main. This switching-off operation coincides with the attainment of the required balancing position, thus ensuring that the main shaft 3 stops at that required rotary angle position. The timer 8 can be switched on at any moment in time within the second braking phase, as from the time $t_4$. Within that braking phase, which is the second braking phase in the illustrated embodiment, it is guaranteed that the end of the remaining braking distance coincides with the desired rotary angle stoppage position or balancing position of the main shaft and the rotary member carried thereon.

It will be seen from the foregoing therefore that the method of the invention provides a method of stopping an electric motor-driven balancing machine main shaft in a simple automated procedure, involving components which are readily included in a balancing machine structure.

It will be appreciated that the above-described method according to the invention has been set forth solely by way of example and illustration of the principles of the invention and that various modifications and alterations may be made therein without thereby departing from the spirit and scope of the invention.

What is claimed is:

1. A method of stopping a main shaft of a balancing machine at a given rotary angle position after an imbalance measuring run, said main shaft being driven by a main shaft driver, the method comprising:

decelerating the rotary movement of the main shaft;

measuring a level of deceleration of the main shaft during the step of decelerating;

ascertaining from the measured level of deceleration a resulting braking distance which corresponds to the given rotary angle position;

interrupting the step of decelerating after the measurement of the level of deceleration whereby the main shaft continues to rotate at an almost constant rotary speed; and resuming the step of decelerating utilizing the measured level of deceleration and at a given angle such that the end of the ascertained braking distance coincides with the given rotary angle position.

2. A method as set forth in claim 1, wherein the rotary speed of the main shaft is altered to adapt the ascertained braking distance to the braking distance required for attaining the given rotary angle position.

3. A method as set forth in claim 1, wherein a timer is switched on after the step of interrupting the decelerating step and before the given rotary angle position is reached, said timer predetermining, independent of the rotary movement of the main shaft, a time interval based on the rotary speed and the rotary angle position of the main shaft when the timer is switched on, and wherein at the end of said time interval, the step of decelerating terminates with the main shaft being stopped.

4. A method as set forth in claim 3, wherein said main shaft driver comprises an electric motor, and wherein the step of decelerating is effected by stopping said electric motor at the end of said time interval.

5. A method as set forth in claim 3, wherein during the step of decelerating the method comprises the additional step of switching on the timer at a rotary speed which is slowed to a given value.

6. A method as set forth in claim 5, wherein respective rotary speeds are ascertained during the step of decelerating.

7. A method as set forth in claim 3 wherein a change in the rotary speed of the main shaft is effected prior to the timer being switched on.

8. A method as set forth in claim 7, wherein the given rotary angle position is attained by the main shaft at the end of the change in rotary speed within a rotary angle range greater than the rotary angle which when the timer switches on is to be covered by the main shaft until the main shaft stops.

9. A method as set forth in claim 3, wherein said time is switched on a few angular degrees prior to the given rotary angle position of the main shaft.

10. A method as set forth in claim 3, wherein said timer is switched on at about 3° prior to the given rotary angle position of the main shaft.

11. A method as set forth in claim 8, wherein said rotary angle range after which the given rotary angle position is reached is approximately 30°.

12. A method as set forth in claim 1, wherein the rotary speeds of the main shaft are measured at at least first and second times during the step of decelerating to determine the level of deceleration.

13. A method as set forth in claim 1, wherein said main shaft is decelerated solely by reversing an electric motor torque.

14. A method as set forth in claim 1, wherein said main shaft driver comprises an electric motor, and said electric motor is switched off when the given rotary angle position is reached.

15. A method as set forth in claim 1, wherein said main shaft driver comprises a single-phase ac electric motor operable to decelerate the rotation of the main shaft by torque reversal.

16. A method as set forth in claim 1, wherein said main shaft driver comprises a three-phase electric motor operable to decelerate the rotation of the main shaft by torque reversal.

17. A method as set forth in claim 15, wherein the phase sequence of the ac voltages applied to the electric motor is changed.

18. A method as set forth in claim 16, wherein the phase sequence of the ac voltages applied to the electric motor is changed.

19. A method as set forth in claim 1, wherein control of said main shaft driver is actuated by relays involving switching delays, and wherein said switching delays are taken into consideration in calculating the switching times for switching operations to be effected during the step of decelerating.

20. A method as set forth in claim 19, wherein said switching delays are taken into consideration in calculating the switching time interval with which the timer is loaded.

21. A method as set forth in claim 3, wherein during the step of decelerating, wherein an end portion of said remaining braking distance coincides with the given rotary angle, the additional step of actuating the timer occurs, enabling the timer to switch off current to the motor independent of the rotation of the main shaft when the main shaft has reached the given rotary angle position.

\* \* \* \* \*